United States Patent
Landreau et al.

(10) Patent No.: US 6,461,413 B1
(45) Date of Patent: Oct. 8, 2002

(54) METHOD FOR DEHYDRATING A WET GAS USING A LIQUID DESSICANT, WITH ADVANCED REGENERATION OF SAID DESSICANT

(75) Inventors: Benoit Landreau, Châtenay Malabry; Jean-Claude Amande, Villepreux, both of (FR)

(73) Assignee: Prosernat, Paris la Defense Cedex (FR)

(*) Notice: Subject to any disclaimer, the term of this patent is extended or adjusted under 35 U.S.C. 154(b) by 0 days.

(21) Appl. No.: 09/555,643

(22) PCT Filed: Nov. 27, 1998

(86) PCT No.: PCT/FR98/02554
§ 371 (c)(1),
(2), (4) Date: Nov. 27, 2000

(87) PCT Pub. No.: WO99/28014
PCT Pub. Date: Jun. 10, 1999

(30) Foreign Application Priority Data

Dec. 2, 1997 (FR) .............................................. 97 15268

(51) Int. Cl.$^7$ .............................................. B01D 53/14
(52) U.S. Cl. .............................. 95/161; 95/165; 95/167; 95/173; 95/174; 95/179; 95/180; 95/193; 95/194; 95/231
(58) Field of Search .......................... 95/161, 163, 164, 95/165, 166, 167, 173, 174, 178, 179, 180, 193, 194, 209, 231

(56) References Cited

U.S. PATENT DOCUMENTS

| | | | |
|---|---|---|---|
| 3,104,958 A | * | 9/1963 | Smith et al. |
| 3,182,434 A | * | 5/1965 | Fryar |
| 3,253,390 A | * | 5/1966 | Connors |
| 3,254,473 A | * | 6/1966 | Fryar et al. |
| 3,648,434 A | * | 3/1972 | Gravis III et al. |
| 4,035,166 A | * | 7/1977 | Van Hecke |
| 4,162,146 A | * | 7/1979 | Alleman |
| 4,302,220 A | * | 11/1981 | Volkamer et al. |
| 4,979,966 A | * | 12/1990 | Rojey et al. |
| 5,209,762 A | * | 5/1993 | Lowell |
| 5,453,114 A | * | 9/1995 | Ebeling |
| 5,490,873 A | * | 2/1996 | Behrens et al. |
| 5,643,421 A | * | 7/1997 | Smith |
| 5,665,144 A | * | 9/1997 | Hill et al. |
| 5,766,313 A | * | 6/1998 | Heath |
| 5,766,423 A | * | 6/1998 | Smith |
| 5,797,981 A | * | 8/1998 | Collin et al. |
| 6,001,153 A | * | 12/1999 | Lebas et al. |
| 6,004,380 A | * | 12/1999 | Landreau et al. |
| 6,299,671 B1 | * | 10/2001 | Christensen |

* cited by examiner

*Primary Examiner*—Duane S. Smith
(74) *Attorney, Agent, or Firm*—Millen, White, Zelano & Branigan, P.C.

(57) ABSTRACT

In a process using a hydrophilic liquid desiccant, for dehydrating a gas containing water with regeneration of the steps of: (a) absorbing water by contact between the moist gas and regenerated liquid desiccant from step c), producing a dry gaseous effluent and a stream of liquid desiccant charged with water and absorbed gases; (b) regenerating the liquid desiccant charged with water in a regeneration zone constituting a reboiling zone and a distillation zone, the charged liquid desiccant being sent to said distillation zone, from which a vapor containing water leaves overhead and from which liquid desiccant still containing water leaves from the bottom in the reboiling zone; (c) passing the liquid desiccant from the reboiling zone of step b) and still containing water to an absorption zone, in which the water in the desiccant is vaporized and the water vapor is absorbed by a fraction of regenerated or non regenerated desiccant, passing the resultant desiccant which has absorbed water vapor to the reboiling zone of step b) and returning resultant regenerated desiccant from the absorption zone, to the absorption zone of step a).

19 Claims, 6 Drawing Sheets

METHOD FOR DEHYDRATING A WET GAS USING A LIQUID DESSICANT, WITH ADVANCED REGENERATION OF SAID DESSICANT

FIELD OF THE INVENTION

The invention relates to a process for dehydrating a gas containing water using a liquid desiccant. More particularly, the invention relates to a process for regenerating said liquid desiccant using a simple, economic means which does not pollute the environment in any way.

BACKGROUND OF THE INVENTION

Dehydrating a gas, for example a natural gas or a refinery gas, is a conventional operation which enables the dew point of the water in said gas to be controlled Such an operation thus prevents hydrates or ice from forming during transport or use of said gas, and it can also reduce the risk of corrosion.

To this end, the gas is routinely brought into contact with a hydrophilic liquid desiccant. Such desiccants include glycols and polyglycols. Because of its high affinity for water, its chemical stability and its low cost, triethylene glycol (TEG) is the most frequently used.

BRIEF DESCRIPTION OF THE DRAWINGS

FIGS. 4, 5 and 6 show different particular embodiments of the process according to the invention:
  particularly in FIGS. 4 and 5, the water from the vapor generated by the liquid from the reboiling zone is absorbed using a fraction of non-regenerated liquid desiccant.

In all of these figures, the regeneration zone R1 comprises a distillation zone D1.

Figure 1:
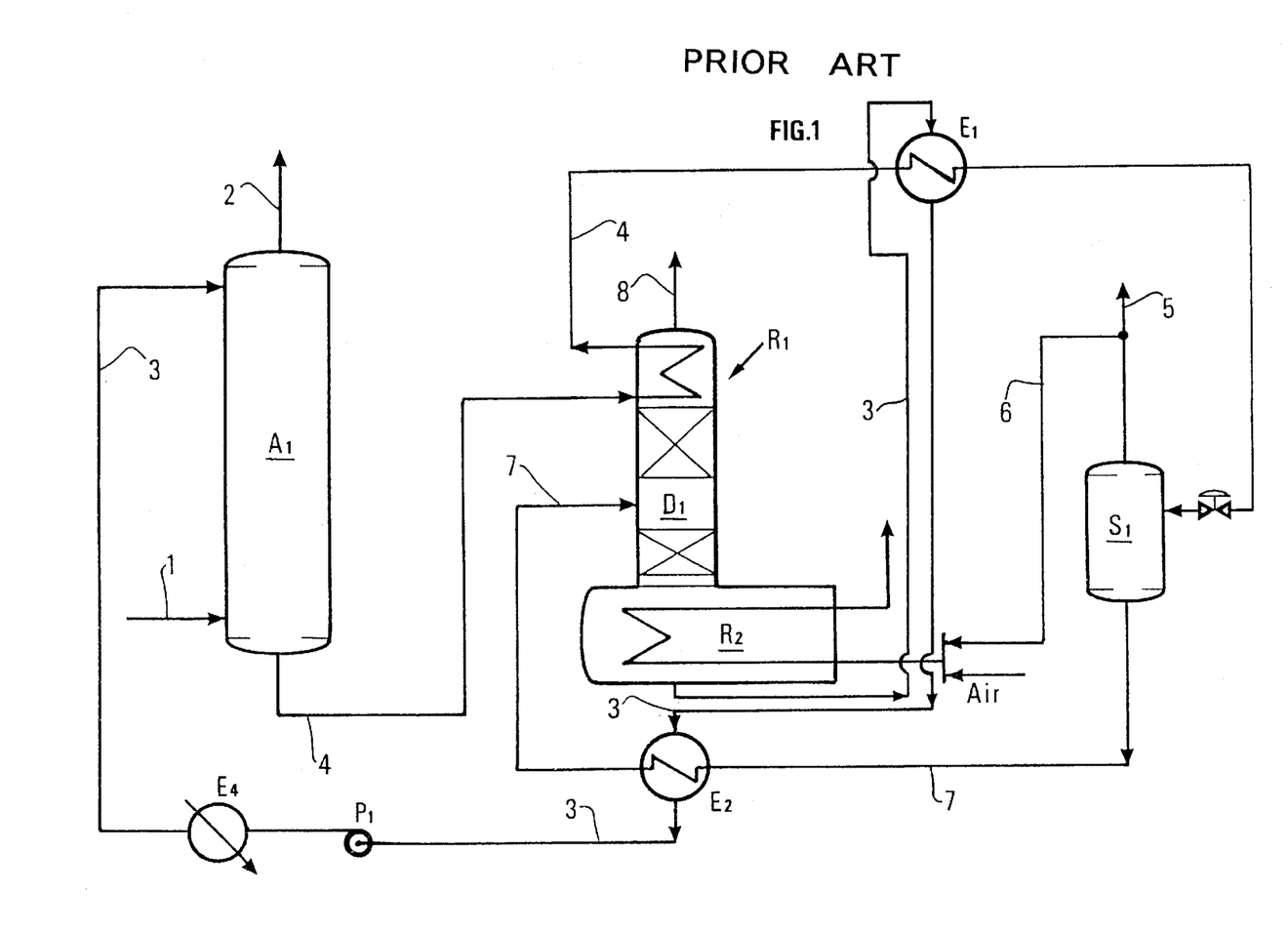
FIG. 1 shows in diagrammatic form a conventional gas dehydration unit using a liquid desiccant, for example a glycol.

In a conventional gas dehydration unit using a liquid desiccant, for example a glycol, as shown in diagrammatic form in the accompanying FIG. 1, moist gas enters the bottom of an absorption column A1 via line 1, operating under pressure, where it comes into contact with a circulating counter-current of liquid desiccant introduced to overhead via line 3. During contact, water contained in the gas is absorbed by the desiccant. The dehydrated gas leaves the head of the absorption column under high pressure via line 2. From its outlet at the bottom of column A1, the desiccant charged with water is sent via line 4 to the head of a regeneration unit R1, where it is used as a cooling fluid. It can be re-heated by passing it into an exchanger E1, then after depressurizing, it can be sent to a flash separation drum S1 the pressure of which is lower that that in absorption column A1. In some cases, it is possible to send the desiccant charged with water firstly to the flash separation drum before using it as a cooling fluid at the head of regeneration unit R1. A large portion of the gas absorbed at high pressure by the desiccant is separated from the liquid phase in drum S1. The gas can either be discharged to the atmosphere via line 5, or used as a fuel gas for the desiccant regeneration step. It is then sent to the burner of reboiler R2 of regeneration apparatus R1.

The liquid desiccant containing water, but separated from the gas absorbed at high pressure, leaves flash separation drum S1 via line 7. After passing into at least one heat exchanger E2, where it is re-heated, it is sent via line 7 to a distillation zone in thermal regeneration apparatus R1, in which a portion of the water absorbed by the desiccant is vaporised and eliminated overhead via line 8 while regenerated desiccant which leaves the bottom via line 3 traverses exchanger E1 then exchanger E2, in which it is cooled, and is sent via a pump P1 to a chiller E4, then to the head of absorption column A1.

However, it is well known that the water cannot be completely separated from the desiccant by a thermal route carried out at atmospheric pressure, in particular when the desiccant degrades at a temperature which is below its normal boiling point. Thus TEG boils at about 285° C., but a limit of 204° C. is generally set during regeneration to limit degradation. At that temperature, the purity of the regenerated TEG is generally close to 98.7% by weight.

If a higher purity is desired for the liquid desiccant (in particular a glycol) in order to dehydrate the gas more efficiently, a conventional means consists of using a stripping step after the heat re-concentration step.

Figure 2:
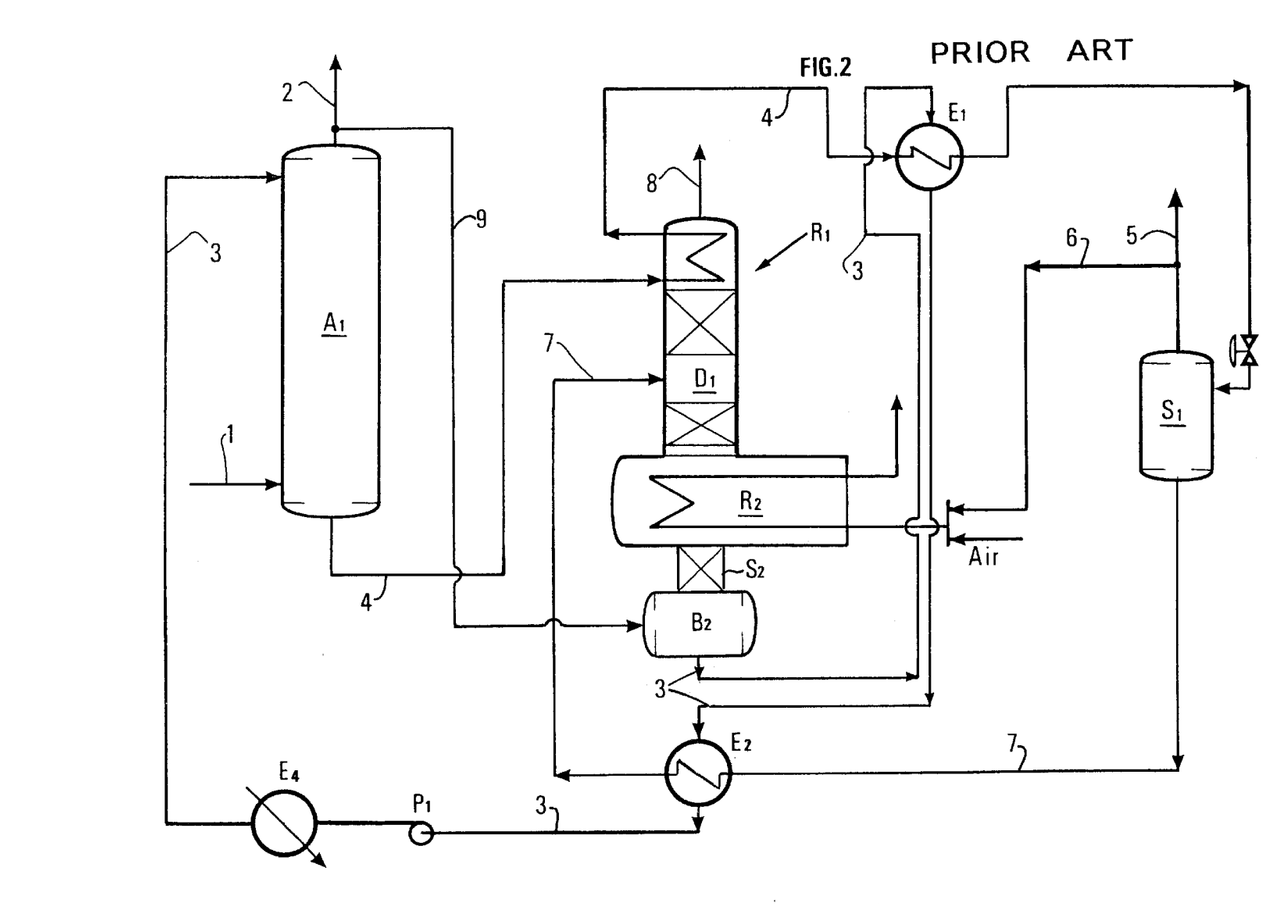
FIG. 2 shows in diagrammatic form a process in which the stripping is carried out using a gas which is dry or with a low water content, for example a portion of the gas stream dehydrated by the desiccant, as disclosed in U.S. Pat. No. 3,105,748.

Such stripping can be carried out using a gas which is dry or with a low water content, for example a portion of the gas stream dehydrated by the desiccant, as described in particular in U.S. Pat. No. 3,105,748. In such a process, as shown in diagrammatic form in FIG. 2, the liquid desiccant which is depleted in water falls under gravity from reboiler R2 into a stripping zone S2, in which it is brought into contact with a counter-current of a stripping agent (the dehydrated gas) arriving in a drum B2 via a line 9.

Stripping can also be carried out using a stripping agent which is liquid at room temperature and pressure and which forms a heteroazeotrope with water, as described in French patent FR-B-2 698 017. The agent used in the latter case is an aromatic compound (benzene, toluene, ethylbenzene and/or a xylene) which may be found in the gas to be treated. That type of system causes a loss of gas which cannot be sold, and supplemental pollution.

In order to satisfy new constraints regarding the emission of toxic products into the atmosphere, the process has been modified to reduce discharges. However, reducing such discharges involves rather high costs.

A further technique consists of recovering the liquid effluent from reboiler R2 of liquid desiccant regeneration apparatus R1, in a volume, using an overflow. A vapor effluent, which is rich in water, and generated by said liquid effluent, is produced in the volume. The vapor is then recovered and the purity of the liquid effluent leaving the volume can reach 99.9% by weight. The liquid effluent, which is depleted in water, is then sent to the absorption column.

U.S. Pat. No. 4,332,643 describes a process (the Coldfinger process) in which vapor effluent is condensed in a bundle of tubes through which a cold liquid desiccant solution flows, as shown diagrammatically in FIG. 3. In such a process, liquid from reboiler R2 flows towards the volume or drum B1 via an overflow. The vapor, which is rich in water and generated by said liquid from drum B1, is condensed on the tube bundle E3. Liquid desiccant, which is cold and rich in water, leaves absorption column A1 via line 4 and passes through said bundle. The liquid effluent from said condensed vapor is recovered and sent to regeneration unit R1, via lines 9 then 7 and 10. The regenerated liquid desiccant is recovered via line 3 for sending via exchanger E1, pump P1 and exchanger E4 to absorption column A1.

SUMMARY OF THE INVENTION

The invention concerns a novel process which can reduce the quantity of water from the desiccant originating from the desiccant regeneration apparatus. This novel process enables desiccant solutions to be regenerated with a purity of over 99.9% by weight (i.e., less than 0.1% water).

In general, the invention provides a process for dehydrating a gas containing water (for example a natural gas or a refinery gas) which uses a hydrophilic liquid desiccant (in particular a glycol), with regeneration of said liquid desiccant, the process comprising:

(a) a step for absorbing water by contact between said moist gas and regenerated liquid desiccant from step c), producing a dry gaseous effluent and a stream of liquid desiccant charged with water and absorbed gases;

(b) a step for regenerating said liquid desiccant charged with water in a regeneration zone comprising a reboiling zone and a distillation zone, the charged liquid desiccant being sent to said distillation zone, from which a vapor containing water leaves overhead and from which liquid desiccant still containing water leaves from the bottom in the reboiling zone; and (c) a step in which said liquid desiccant from the reboiling zone of step b) is sent to an absorption zone, in which the water in the vapor generated by said desiccant is absorbed by a fraction of regenerated or non regenerated desiccant, removed at a point in the process, returning said desiccant which has absorbed water from said vapor to the reboiling zone of step b) and returning regenerated desiccant to the absorption zone of step a).

The absorption zone of step c) can be provided with an integral heating means to keep the liquid desiccant originating from the reboiling zone of step b) at substantially the same temperature.

While the process of the invention can be applied to any moist gas, it can in particular be applied to natural gas and refinery gases; they contain a major proportion of at least one light hydrocarbon, principally methane, but also ethane, propane and/or butane. They can also contain small proportions of aromatic compounds (benzene, toluene, ethylbenzene and/or xylenes), also carbon dioxide, nitrogen and/or hydrogen sulfide. By way of indication, the water content of the natural gases considered in the invention can be from about 30 to $10^5$ mg per Standard m$^3$, for example.

In the process of the invention, it is possible to provide a step d) after step a), in which step d) the liquid desiccant charged with water and absorbed gases is depressurized and separated into a vapor containing principally said absorbed gases and into a liquid phase containing principally the liquid desiccant charged with water.

DETAILED DESCRIPTION OF THE INVENTION

Different particular embodiments of the process according to the invention will be described below in more detail with reference to FIGS. 4, 5 and 6.

Figure 4:
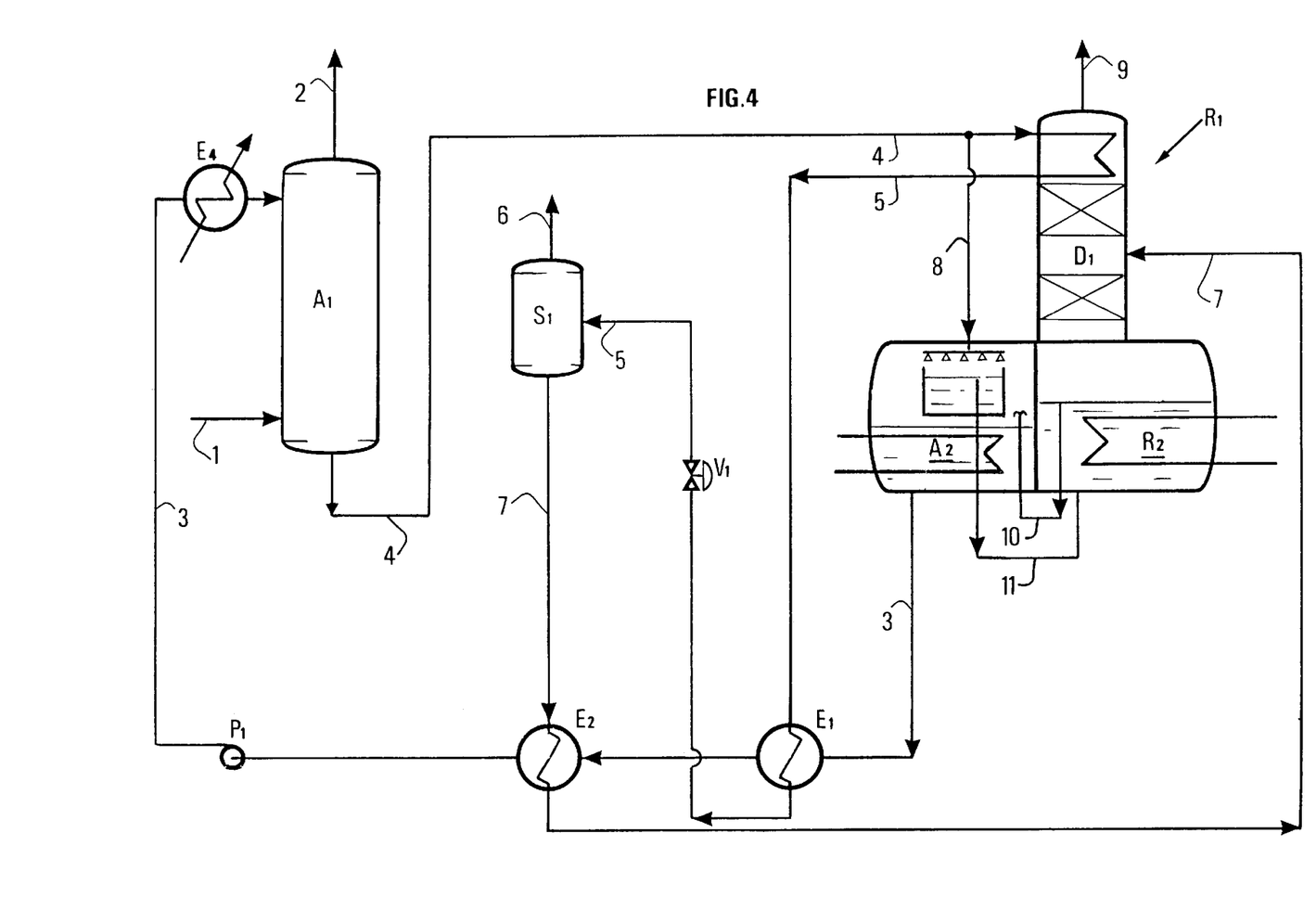
Figure 5:
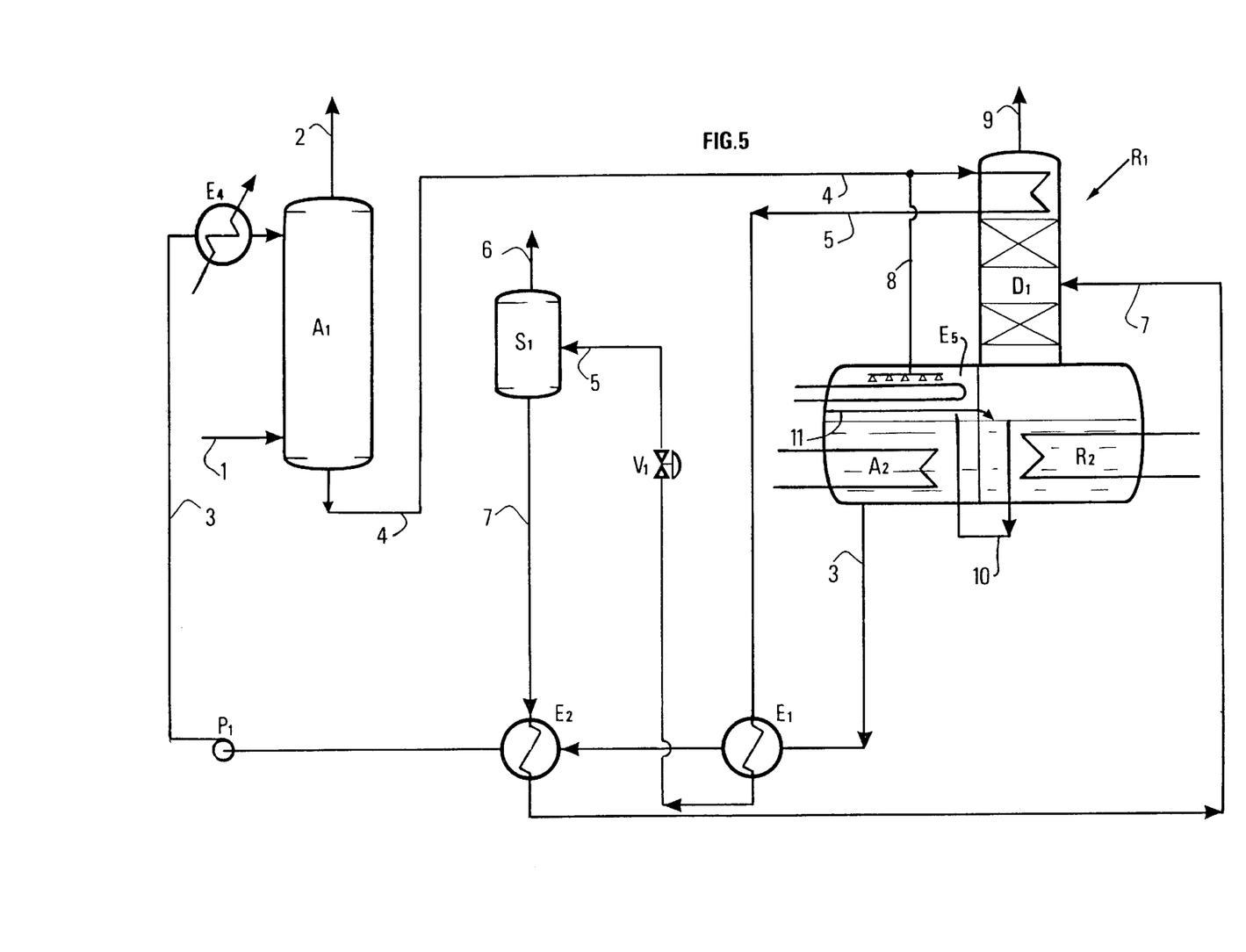

In the case of FIGS. 4 and 5, the water from the vapor generated by the liquid from the reboiling zone of step b) is absorbed in step c) using a fraction of non regenerated liquid desiccant. Further, the temperature and pressure indications given below are more particularly relative to the use of triethylene glycol as a liquid desiccant.

In step a), the moist gas stream, arriving via line 1, is brought into contact in absorption column A1 with a counter-current of regenerated liquid desiccant arriving via line 3, which produces a dry gaseous effluent leaving overhead via line 2 and a stream of liquid desiccant charged with water and small quantities of absorbed gases (light hydrocarbons and, possibly, aromatic compounds, also carbon dioxide, nitrogen and/or hydrogen sulfide) leaving the bottom of absorption column A1 via line 4.

In this step, the moist gas (for example natural gas) enters at the production pressure (in general 20 to 150 bars) and at a temperature of less than 50° C. If the production temperature of the gas is higher than this value, said gas will be cooled, for example using an air-cooled exchanger (not shown in FIG. 4 or FIG. 5), before it enters column A1.

The liquid desiccant introduced to the head of column A1 via line 3 is conventionally at a temperature of about 5° C. higher than that of the gas to be treated and at a pressure equal to that of the gas. If the temperature of the liquid desiccant does not satisfy that condition, said liquid desiccant will be cooled using exchanger E4 (for example an air-cooled exchanger) before it enters column A1. The stream of liquid desiccant leaving the absorption column A1 via line 4 is generally at the temperature of the gas to be treated.

A fraction of said stream of liquid desiccant leaving via line 4 is sent via line 8 to the absorption apparatus A2 to carry out the second regeneration operation of the liquid desiccant charged with water, as will be described below (step c)).

The other fraction of said stream of liquid desiccant is sent as a cooling fluid to the head of distillation column D1 of regeneration apparatus R1, where the temperature of said fraction increases generally by about 10° C. Said fraction is directed via line 5 towards a heat exchanger E1 in which it is re-heated to a temperature of about 80° C.; it is then depressurised via valve V1 to a pressure of about 4 bars, for example, then finally it is sent to flash separation drum S1.

In step b), the stream of liquid desiccant is sent via line 7 to distillation column D1 of regeneration apparatus R1, which also includes a reboiler R2. A vapor effluent which is rich in water and which may contain aromatic compounds leaves from the head of this apparatus via line 9 and a liquid effluent constituting the partially regenerated liquid desiccant (in general about 99% rich) leaves from the bottom, and is sent to absorber A2 via an overflow 10 to undergo the second regeneration operation (step c)).

Before it enters distillation column D1, the stream of liquid desiccant is generally heated via heat exchanger E2 to a temperature of about 160° C.

In step c), the liquid effluent leaving overflow 10 (at a temperature of 204° C.) and principally containing the desiccant generates a vapor which is rich in water in absorber A2 in which the temperature can be kept to the same value as in reboiler R2, for example using an integral heating means. The water contained in said vapor is absorbed by the liquid effluent arriving from absorption column A1 via line 8. Said liquid effluent is brought into contact with said vapor by spraying it into the top of absorber A2. Said liquid effluent, having absorbed said vapor, is recovered in a compartment of absorber A2, then sent to the reboiler via an overflow 11. The liquid effluent from the reboiler and which has undergone absorption step c) is sent to column A1 via line 3.

The liquid effluent leaving absorber A2 via line 3 at a temperature of about 200° C. is generally over 99.9% pure. Said liquid effluent is cooled to a temperature of about 80° C. by passing it through two heat exchangers E1 and E2 in succession. Its pressure is also adapted to that in absorption column A1 using a pump P1.

When a separation step d) is used, the stream of liquid desiccant is separated in flash separation drum S1, into a vapor effluent leaving overhead via line 6 and containing the absorbed gases (light hydrocarbons and possibly at least a portion of the aromatic compounds, and possibly carbon dioxide, nitrogen and/or hydrogen sulfide) and a liquid phase principally containing the liquid desiccant charged with water and, possibly, the remaining aromatic compounds, which leaves from the bottom via line 7.

Different configurations can be envisaged for carrying out the process of the invention.

Thus the temperature of the non regenerated liquid desiccant removed from the outlet of absorption column A1 can be too high to allow perfect absorption of the vapor phase generated by the liquid effluent from reboiler R2, by said liquid desiccant fraction.

Two cases are possible.

1) The flow rate of said fraction of non regenerated liquid desiccant at the inlet to absorber A2 is low and the external temperature is low: the upper portion and the walls of the absorber are thus not insulated. Said fraction of liquid desiccant, carrying out absorption of the vapor, is sprayed onto the non insulated walls of absorber A2. The process for dehydrating moist gas (for example natural gas or refinery gas) operates in identical fashion to that described above and shown in FIG. 4. Said fraction of liquid desiccant, having absorbed said vapor phase, is recovered in a collecting means and returned to the reboiler R2 of regeneration apparatus R1 via overflow 11.

2) The flow rate of said non regenerated liquid desiccant at the inlet to absorber A2 is high: the absorption step c) for vapor phase generated by the liquid effluent from reboiler R2 by said fraction of liquid desiccant is thus carried out using the process shown schematically in FIG. 5, described below.

Said fraction of liquid desiccant removed from a point of the absorption column A1 outlet sent to the inlet to absorber A2 via line 8 is sprayed onto heat exchanger E5 inside absorber A2 on which it is cooled. The water from the vapor generated by the effluent from the liquid desiccant from reboiler R2 is thus absorbed by said cooled fraction of liquid desiccant. Said fraction of liquid desiccant, having absorbed water from said vapor phase, is recovered in a collecting means (for example at least one broil pan) and sent to reboiler R2 of regeneration apparatus R1, via line 11. The description of the operation of the remainder of the process for dehydrating moist gas (for example natural gas or refinery gas) is otherwise identical to that described above and shown in FIG. 4.

Figure 6:
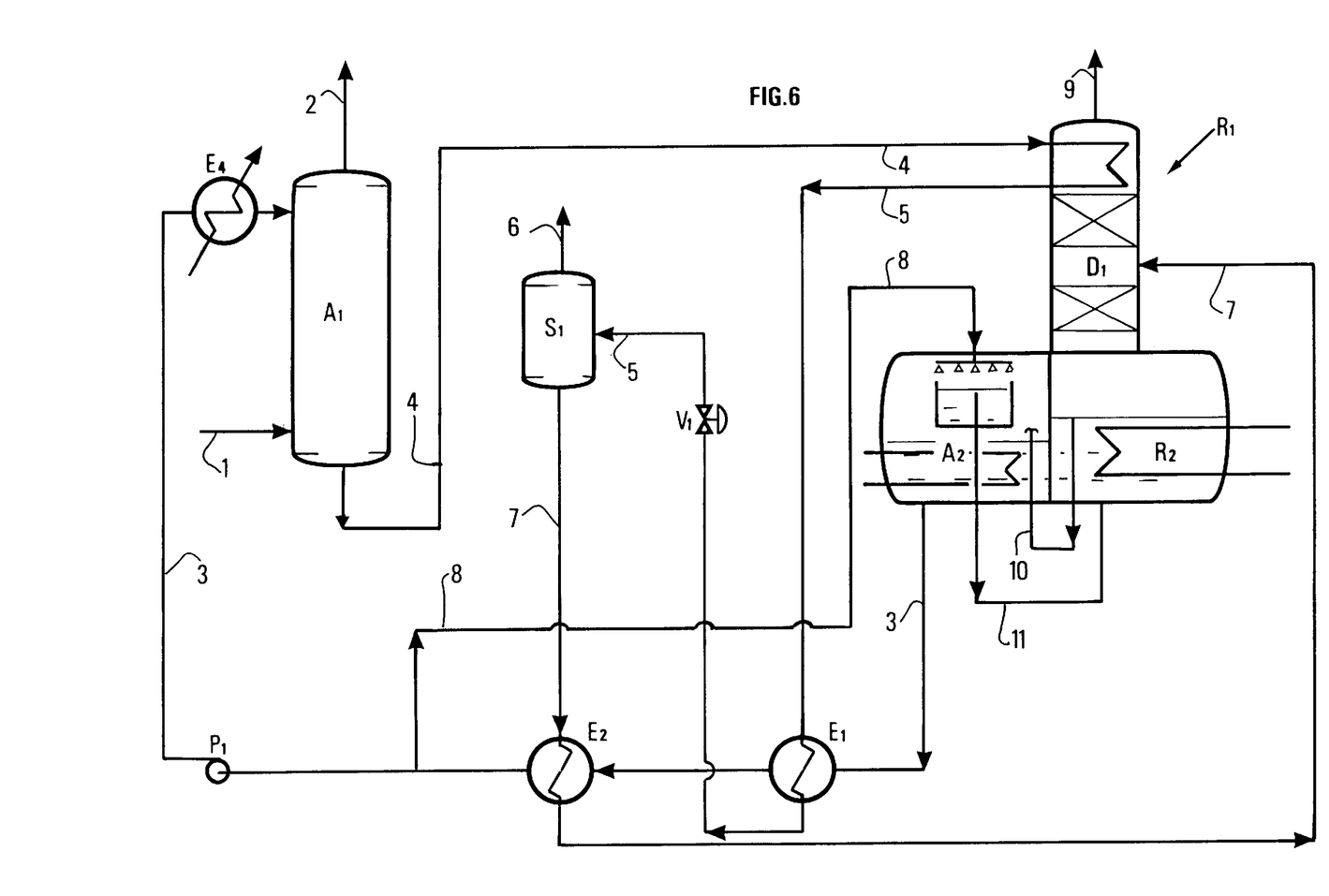
FIG. 6 shows more particularly a process in which the absorption of water from the vapor phase generated by the liquid desiccant from the reboiler of the regeneration apparatus is carried out via a regenerated liquid desiccant.

A final case consists of carrying out the phase c) for absorbing water from the vapor phase generated by the liquid desiccant from the reboiler of the regeneration apparatus of step b) via a regenerated liquid desiccant using the process described in FIG. 6.

In step c), liquid effluent leaving overflow 10 at 204° C. can be kept at the same temperature in absorber A2 using an integral heating apparatus. In absorber A2, this liquid effluent generates a vapor which is rich in water. The water contained in said vapor, generated by said liquid effluent containing principally desiccant, is absorbed by a fraction of regenerated liquid desiccant removed via line 8 from the stream of regenerated liquid desiccant returned via line 3 to absorber A1 after cooling in exchangers E1 and E2. Said liquid desiccant fraction, sprayed into the top of absorber A2, absorbs water from said vapor. Said liquid desiccant fraction, enriched in water, is recovered in a compartment of absorber A2 then sent to reboiler R2 via overflow 11. The liquid effluent from the reboiler which has undergone the second drying step during step c) is sent to column A1 via line 3. The remainder of the process for dehydrating moist gas (for example natural gas or refinery gas) is otherwise identical to that described above and shown in FIG. 4.

The advantages of implementing a second absorption zone such as A2 using the process of the present invention can be evaluated by comparing its performance with that of the process described in U.S. Pat. No. 4,332,643 (Coldfinger process). The gas top of absorber A2 is much drier than in the prior art process which as a result brings the desiccant (for example TEG) to a higher purity than that of the desiccant leaving the Coldfinger process.

The entire disclosure of all applications, patents and publications, cited above and below, and of corresponding French application 97/15268, filed Dec. 2, 1997, are hereby incorporated by reference.

The following examples can be made by way of illustration.

EXAMPLES

Example 1 (Comparison)

Figure 3:
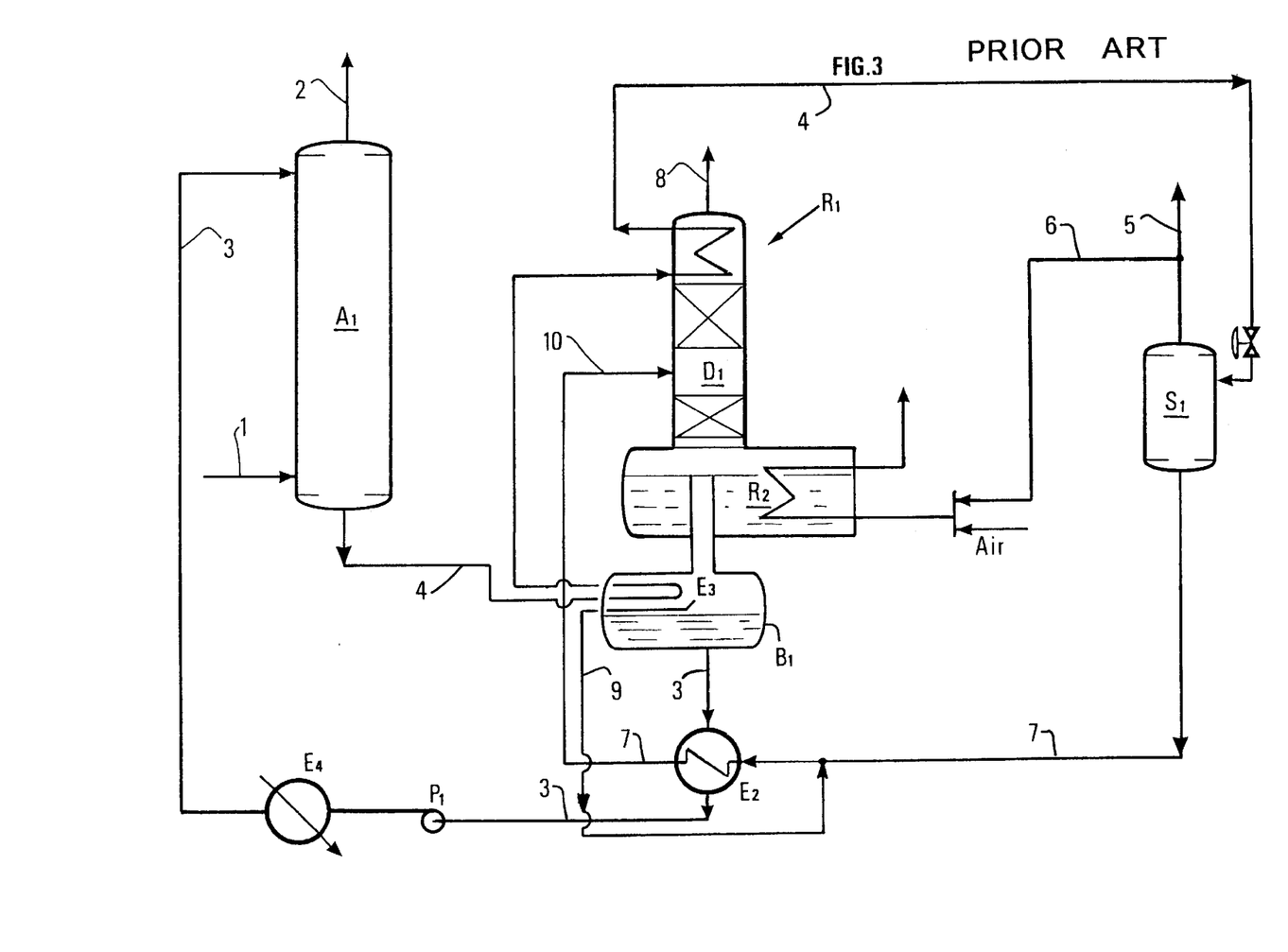
FIG. 3 shows diagrammatically a process (the so called "Coldfinger process") in which vapor effluent is condensed in a bundle of tubes through which a cold liquid desiccant solution flows, as disclosed in U.S. Pat. No. 4,332,643.

The vapor generated by the liquid desiccant from reboiler R2 is condensed on a bundle of tubes through which a solution of rich TEG at 40° C. passes, the partial pressure of the water in the gas top of drum B1 in the process shown in FIG. 3 (Coldfinger process) is 0.075 bars.

Example 2

In the process of the present invention, the vapor generated by the liquid desiccant from reboiler R2 is condensed by spraying a rich TEG solution (95% purity) at 40° C., the partial pressure of water in the gas top of absorber A2 is 0.015 bars.

In this case, the partial pressure of water is much lower, and as a result the liquid desiccant from reboiler R2 is dried to a much greater extent. The performance of absorber A2 in the process carried out in accordance with the present invention is thus much higher than that of a Coldfinger type process.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for dehydrating a gas containing water which uses a hydrophilic liquid desiccant, with regeneration of said liquid desiccant, comprising:

(a) a step for absorbing water by contact between said moist gas and regenerated liquid desiccant from step c), producing a dry gaseous effluent and a stream of liquid desiccant charged with water and absorbed gases;

(b) a step for regenerating said liquid desiccant charged with water in a regeneration zone comprising a reboiling zone and a distillation zone, the charged liquid desiccant being sent to said distillation zone, from which a vapor containing water leaves overhead and liquid desiccant still containing water leaves from the bottom in the reboiling zone; and (c) a step in which said liquid desiccant from the reboiling zone of step b) and still containing water is sent to an absorption zone, in which the water in the vapor generated by said desiccant is absorbed by a fraction of regenerated or non regenerated desiccant, removed at a point in the process, returning said desiccant which has absorbed water from said vapor to the reboiling zone of step b) and returning the regenerated desiccant to the absorption zone of step a).

2. A process according to claim 1, wherein the absorption zone of step c), the desiccant from the reboiling zone of step b) is kept at substantially the same temperature using an integral heating means.

3. A process according to claim 1, wherein said moist gas is selected from natural gas and refinery gases and contains at least one light hydrocarbon containing 1 to 4 carbon atoms.

4. A process according to claim 3, wherein said light hydrocarbon is at least methane.

5. A process according to claim 1, wherein characterized in that the charged liquid desiccant from step a) acts as a cooling fluid at the head of the distillation zone of step b).

6. A process according to claim 1, further comprising after step a), a step d) in which the liquid desiccant charged with water and absorbed gases is depressurized and separated into a vapor containing principally said absorbed gases and a liquid phase containing principally the liquid desiccant charged with water.

7. A process according to claim 6, wherein:
   in step a), the moist gas stream is brought into contact in an absorption column A1 with a counter-current of regenerated liquid desiccant, which produces a dry gaseous effluent leaving overhead and a stream of liquid desiccant charged with water and absorbed gases leaving the bottom of said absorption column A1;
   in step b), the stream of liquid desiccant is sent to a distillation column D1 of a regeneration apparatus R1, which also comprises a reboiler R2 separating a vapor effluent rich in water leaving from the head of the regeneration apparatus R1 via a line 9 and a liquid effluent constituting the partially regenerated liquid desiccant leaving from the bottom thereof, which is sent to an absorber A2 via an overflow to undergo the second regeneration step c); and
   in step c), the liquid effluent leaving the overflow principally containing liquid desiccant generates a vapor which is rich in water in absorber A2, said water-rich vapor being brought into contact with liquid effluent arriving from the absorption column A1 via a line 8, by spraying it into the top of the absorber A2, said liquid effluent, having absorbed said vapor being recovered and sent to the reboiler R2 via an overflow 11 (step b)) and the liquid effluent from the reboiler and which has undergone the second absorption step c) being sent to the column A1 (step a)) via the line 3.

8. A process according to claim 7, characterized in that in the absorber A2, the desiccant arriving via the overflow 10 is kept at substantially the same temperature.

9. A process according to claim 7, wherein before separation step d), the liquid desiccant charged with water is sent as a cooling fluid to the head of the distillation column D1 of the regeneration apparatus R1.

10. A process according to claim 7, wherein in step d), the stream of liquid desiccant is depressurized by a valve V1 and sent to a flash separation drum S1 where it is separated into a vapor effluent leaving overhead via a line 6 and containing at least a portion of the absorbed gases and a liquid phase containing principally the liquid desiccant charged with water, leaving the bottom via a line 7.

11. A process according to claim 7, wherein the fraction of liquid desiccant used for absorbing water in step c) is a fraction of non regenerated liquid desiccant, and in that the upper portion and the walls of the absorber A2 are not insulated and in that the fraction of liquid desiccant which has absorbed the vapor is recovered in a collecting means and returned to the reboiler R2 of the regeneration apparatus R1, for regeneration in step b).

12. A process according to claim 7, wherein the fraction of liquid desiccant used for absorbing water in step c) is a fraction of non regenerated liquid desiccant, in that the fraction of charged liquid desiccant which is sent to the inlet to absorber A2 via line 8 is sprayed into a heat exchanger E5 inside absorber A2 on which it is cooled, and in that the fraction of liquid desiccant which has absorbed the vapor is recovered in a collecting means and sent to the reboiler R2 of the regeneration apparatus R1, for regeneration in step b).

13. A process according to claim 7, wherein the fraction of liquid desiccant used in step c) is a fraction of regenerated liquid desiccant.

14. A process according to claim 1, wherein said gas comprises minor proportions of aromatic compounds, also carbon dioxide, nitrogen and/or hydrogen sulfide.

15. A process according to claim 1, wherein the liquid desiccant is a glycol.

16. A process according to claim 15, wherein the liquid desiccant is triethylene glycol.

17. A process according to claim 1, wherein:
   in step a), the moist gas stream is brought into contact in an absorption column A1 with a counter-current of regenerated liquid desiccant, which produces a dry gaseous effluent leaving overhead and a stream of liquid desiccant charged with water and absorbed gases leaving the bottom of said absorption column A1;
   in step b), the stream of liquid desiccant is sent to a distillation column D1 of a regeneration apparatus R1, which also comprises a reboiler R2, separating a vapor effluent rich in water leaving from the head of the regeneration apparatus R1 via a line 9 and a liquid effluent constituting the partially regenerated liquid desiccant leaving from the bottom thereof, which is sent to an absorber A2 via an overflow to undergo the second regeneration step c); and
   in step c), the liquid effluent leaving the overflow principally containing liquid desiccant generates a vapor which is rich in water in absorber A2, said water-rich vapor being brought into contact with liquid effluent arriving from the absorption column A1 via a line 8, by spraying it into the top of the absorber A2, said liquid effluent, having absorbed said vapor being recovered and sent to the reboiler R2 via an overflow 11 (step b)) and the liquid effluent from the reboiler and which has undergone the second absorption step c) being sent to the column A1 (step a)) via the line 3.

18. A process according to claim 17, wherein the fraction of liquid desiccant used for desiccant used for absorbing water in step c) is a fraction of non regenerated liquid desiccant, and in that the upper portion and the walls of the absorber A2 are not insulated and in that the fraction of liquid desiccant which has absorbed the vapor is recovered in a collecting means and returned to the reboiler R2 of the regeneration apparatus R1, for regeneration in step b).

19. A process according to claim 17, wherein the fraction of liquid desiccant used for absorbing water in step c) is a fraction of non regenerated liquid desiccant, in that the fraction of charged liquid desiccant which is sent to the inlet to absorber A2 via line 8 is sprayed into a heat exchanger E5 inside absorber A2 on which it is cooled, and in that the fraction of liquid desiccant which has absorbed the vapor is recovered in a collecting means and sent to the reboiler R2 of the regeneration apparatus R1, for regeneration in step b).

* * * * *